United States Patent [19]

Griswold et al.

[11] 3,802,979
[45] Apr. 9, 1974

[54] MICROFICHE CONVERTER AND UPDATER METHOD, APPARATUS AND ARTICLE

[75] Inventors: Augustus W. Griswold, Rush; Boris W. Haritonoff, Geneseo, both of N.Y.

[73] Assignee: Arcata Microfilm Corporation, Spring Valley, N.Y.

[22] Filed: July 3, 1972

[21] Appl. No.: 268,792

[52] U.S. Cl................. 156/98, 40/158 B, 156/247, 156/265, 156/291, 156/299, 156/379
[51] Int. Cl....................... B32b 31/00, B32b 35/00
[58] Field of Search............. 40/158 R, 158 B, 159; 156/98, 108, 247, 264, 265, 267, 291, 297, 299, 344, 353, 584, 379

[56] References Cited
UNITED STATES PATENTS

| | | | |
|---|---|---|---|
| 3,645,823 | 2/1972 | Merk et al. | 156/247 |
| 2,987,099 | 6/1961 | Williams et al. | 156/584 |
| 3,634,176 | 1/1972 | Covert et al. | 156/584 |
| 3,547,744 | 12/1970 | Buchaklian | 156/584 |
| 2,363,442 | 11/1944 | Scott | 156/584 |
| 3,347,734 | 10/1967 | Covert et al. | 156/584 |
| 3,089,802 | 5/1963 | Coffman et al. | 156/108 |
| 3,395,061 | 7/1968 | Covert et al. | 156/265 |

*Primary Examiner*—Daniel J. Fritsch
*Attorney, Agent, or Firm*—Schovee & Boston

[57] ABSTRACT

Microfilm is converted into microfiche by feeding the film through a cutter, cutting the film into one or more frames, and then mounting the frame(s) upon a transparent microfiche base. The microfilm has a pair of adhesive strips along the top and bottom edge of its bottom surface for attaching the microfilm to the base. The microfiche base is mounted on a fiche deck by means of registration pins; lights are provided below the fiche deck for informing the operator where to place the frames on the base; and a margin grid having guide bars overlies the base to aid the operator in mounting the frames in precise alignment on the base. The film cutter removes a slice from the cut frames to aid the operator to mount the frames.

The microfiche is updated by mounting all "updatable" frames in the same row and pre-cut from each adjacent frame. A solenoid and its push pin are positioned beneath each updatable frame and a clearance opening for each push pin is located in the microfiche base. To update a microfiche, the proper solenoid is energized to remove one edge of the frame to be updated from the base, the frame is then completely removed, and a new updated frame is substituted for the outdated, removed frame.

14 Claims, 11 Drawing Figures

FILM CENTERING SYSTEM

MICROFICHE CONVERTER AND UPDATER METHOD, APPARATUS AND ARTICLE

BACKGROUND OF THE INVENTION

1. Field of the Invention

This invention relates to microfiche and in particular to a microfiche converter and updater employing microfiche of the type having a transparent base and a plurality of rows of microfilm frames mounted thereon by means of adhesive.

2. Description of the Prior Art

Microfiche of the type having a transparent base and a plurality of rows of microfilm frames mounted thereon by means of adhesive is well-known. However, the microfiche is made by a manual method in which the operator simply cuts off the desired frame(s) and then manually applies it to the base. In the present invention, the operator is aided in mounting the microfiche on the base in that a light is provided underneath the transparent fiche deck corresponding to each frame-receiving area of the microfiche base. The lights can be energized to inform the operator where to place the newly cut frame(s). The operator is also aided by a margin grid overlying the microfiche base and having thin guide ribs that precisely align the newly mounted frame(s) in each row. Regarding updating, according to the prior art if a microfiche included a particular frame or frames which needed updating, the entire microfiche was simply remade and the old, outdated microfiche was destroyed. According to the present invention, however, the particular frame to be updated is easily and quickly removed from the old microfiche and the new updated frame is installed on the same frame-receiving area from which the old frame was removed.

SUMMARY OF THE INVENTION

The microfiche converter/updater of the present invention includes a transparent fiche deck having a pair of spaced-apart, differently shaped, registration pins projecting upwardly therefrom and adapted to be received in a pair of correspondingly shaped and spaced-apart registration openings in a transparent microfiche base. An L.E.D. (light emitting diode) grid is positioned beneath the fiche deck, with the L.E.D.s in a rectilinear array with one light being centrally positioned with respect to each frame-receiving area of the microfiche base. The lights are selectively energized to inform the operator on which frame-receiving area(s) of the base a particular frame(s) is to be mounted during converting, and which frame is to be removed and replaced during updating. A margin grid is hingedly connected to the fiche deck and is adapted to move down on top of the fiche deck and on top of a microfiche mounted on the deck. The margin grid includes a plurality of parallel, spaced-apart, thin ribs to aid the operator in applying a filmstrip or frame to the base in precise alignment thereon. A microfilm roll is mounted on the converter/updater and a predetermined number of frames is cut off from the roll and are mounted on the base in the frame-receiving areas thereof indicated by the energized lights, to convert the microfilm into microfiche.

The present invention also provides for updating of a microfiche by putting all frames which might possibly be desired to be updated in the bottom row of the microfiche and pre-cut from adjacent frames. A solenoid is located beneath each frame-receiving area in the row of updatable frames, with a solenoid push pin (or ejector pin) in alignment with a clearance opening in the transparent microfiche base. To update a particular frame, the microfiche is placed in registration on the fiche deck, the margin grid is positioned on top of the microfiche, a light is energized corresponding to the frame to be updated, and the proper solenoid is energized pushing one end of the frame up. The operator then completes removal of the frame by use of a vacuum tool. After retraction of the solenoid push pin, the new updated frame is mounted in the same frame-receiving area from which the outdated frame was removed.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIG. 6 is a plan view of the fiche desk area of FIG. 1 with the cover 50 removed;

DETAILED DESCRIPTION OF THE PREFERRED EMBODIMENTS

The converter/updater 10 of the present invention converts 16 mm microfilm imagery to microfiche and updates it. The microfiche described below preferably has a format of five rows with 12 frames per row, although other formats can be used. This invention updates the microfiche by the replacement of outdated images or frames in the bottom row with updated frames, and by the addition of frames anywhere on the fiche. The present invention concerns the mechanical aspects of the converter/updater as contrasted to any inventions in the computer and electronics that can be used to make the converter/updater computer-directed and semi-automatic.

While the present invention can be used with any method for mounting microfilm frames on a microfiche base, the preferred system will be described and that is the use of a microfiche wherein the microfilm is mounted on the base by means of a pair of adhesive strips adjacent the top and bottom edges of the microfilm. The adhesive is preferably a double-coated tape applied to the microfilm on the roll with a protective backing layer thereon that is removed as the microfilm comes off of the supply roll on the converter/updater. The microfiche carrier or base is preferably a polyester material about 0.007 inches thick, and the microfilm images are preferably contained on 16 mm Agx roll film at about a 21:1 reduction.

Figure 1:
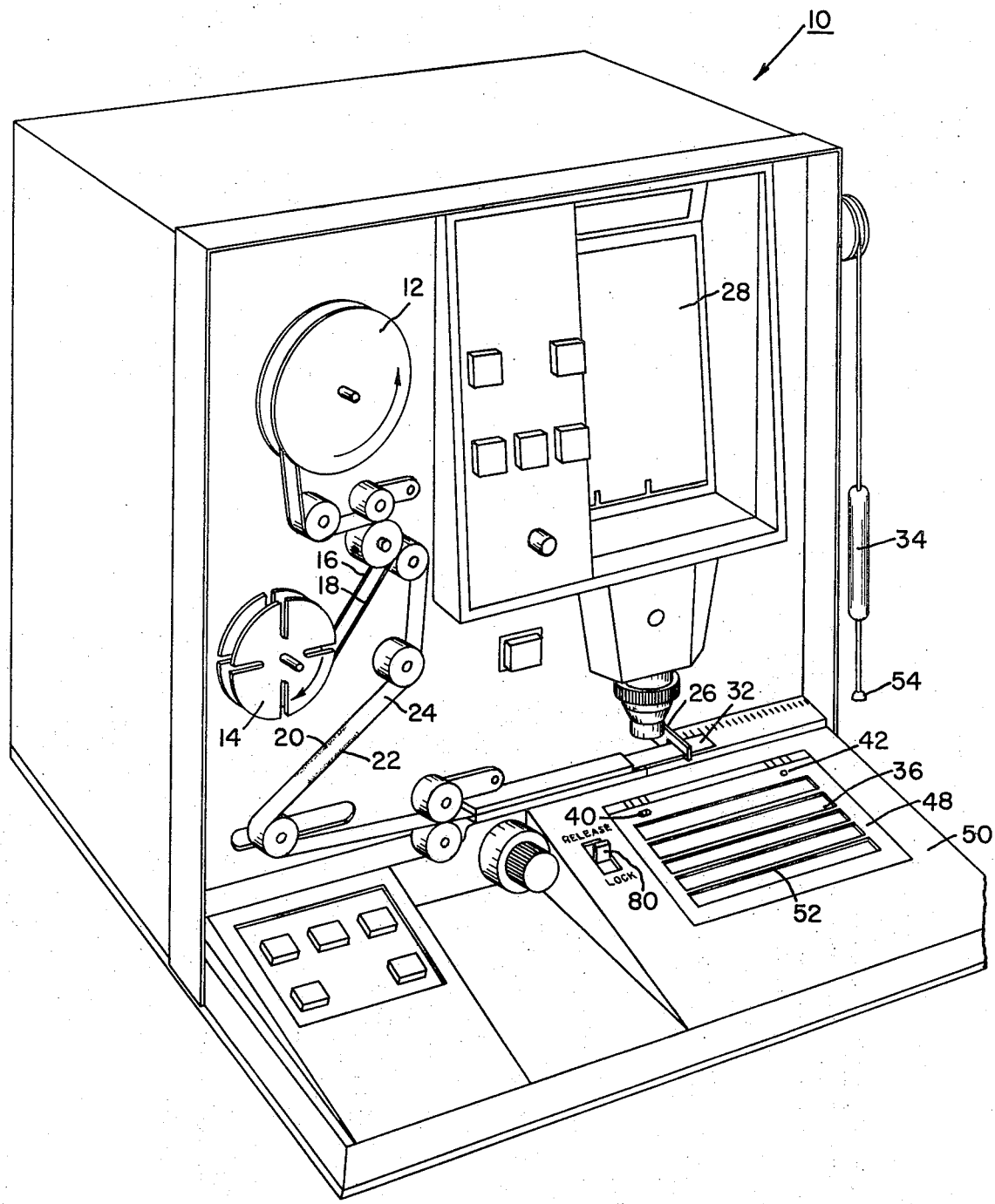
FIG. 1 is a partly diagrammatic isometric view of the converter/updater of the present invention.
Figure 2:
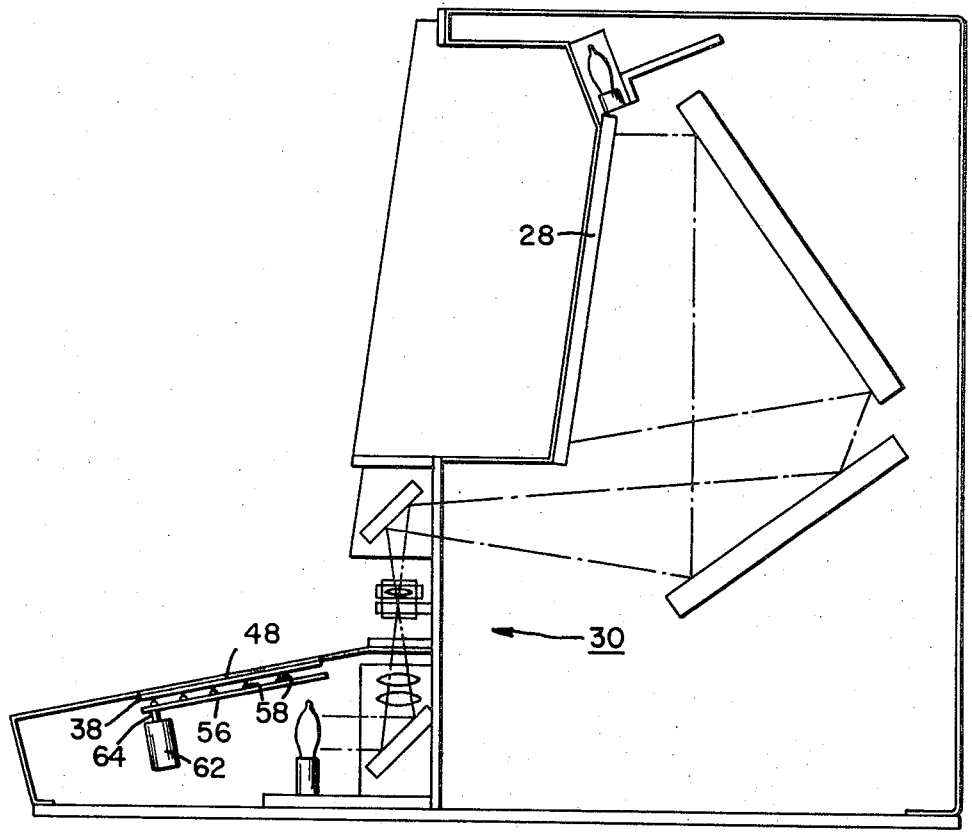
FIG. 2 is a partly diagrammatic, cross-sectional view of the apparatus of FIG. 1.

An overall description of the converter (or mounting) aspect of the present invention will now be described with reference to the drawings. FIGS. 1 and 2 show a converter/updater 10 according to the present invention including a microfilm supply reel 12, and a backing strip collection driven reel 14 for collecting two backing strips 16 and 18 from the two adhesive strips 20 and 22, one on each edge of a filmstrip 24, as the filmstrip 24 is fed from the reel 12 to a cutter 26. A screen 28 and an optical system 30 (see FIG. 2) provide for enlarging and viewing a frame prior to its being cut off by the cutter 26.

After a frame 32, for example, is cut, it is picked up by the operator by means of a vacuum probe 34 and is mounted on a microfiche base 36. The microfiche base 36 is mounted on a fiche deck 38 (see FIG. 4) in predetermined orientation and registration by means of a pair of registration pins 40 and 42 (see FIGS. 1 and 4) extending upwardly from the fiche deck 38 and through a pair of registration openings 44 and 46 (see FIG. 3) in the base 36. A margin grid 48 is hingedly connected to a cover 50 of the converter/updater 10 for movement down onto the top of the microfiche base 36; the margin grid 48 includes a rectangular border 49 and a plurality of parallel equally spaced-apart ribs 52 to aid the operator in mounting the frame 32 (or a filmstrip including a plurality of individual frames) onto the microfiche base 36 in precision alignment thereon.

After the frame 32 is placed on the base 36 in the proper frame-receiving area thereof, the vacuum is disengaged on the vacuum tool 34 and a foot 54 thereof is used by the operator to press the frame 32 down onto the base 36 to assure good adhesive contact therebetween.

The fiche deck 38 includes a separately energizable light source corresponding to each frame-receiving area of the overlying microfiche base 36. This is preferably achieved by making the fiche deck 38 transparent and having an L.E.D. (light emitting diode) grid 56 located directly thereunder. The L.E.D. grid 56 includes a rectilinear array of L.E.D.s 58. The light of the L.E.D.s 58 is used to inform the operator where to place the cut frame(s) 32.

After a microfiche 60 (see FIG. 3) has been prepared according to the present invention, the margin grid 48 is lifted up off of the finished microfiche 60 and the microfiche is removed. Another microfiche base 36 is then placed on the fiche deck 38 for use in preparing another microfiche.

An overall description of the updater aspect of the present invention will now be described with reference to the drawings. It is known when the original material is being microfilmed, what frames are "permanent", i.e. will never need to be updated, and what frames are "updatable", i.e. frames that it may be desired to update in the future. According to the preferred embodiments of the present invention, all of the updatable frames are individually pre-cut and are individually mounted on the microfiche base 36. The permanent frames can be mounted on the base 36 individually or in a series of uncut frames in a filmstrip. Thus, when it is desired to update a particular frame on a particular microfiche, that frame is already separate from any adjacent frame(s), and it does not therefore have to be cut from any adjacent frame(s) before being removed. Thus, it is only necessary to remove it (or un-stick it) from the base.

This removal is accomplished according to the preferred embodiment of the present invention by providing a row of solenoids 62 (see FIGS. 2, 4, and 5) with one solenoid being positioned under each updatable frame. Each solenoid has a push pin 64 (see FIG. 4) adapted to move upwardly, when the solenoid 62 is energized, through a push pin clearance opening 65 in the fiche deck 38, and through a push pin clearance opening 66 in the microfiche base 36 and into contact with the frame to be deleted. The push pin 64 is preferably located directly under the adhesive strip 22 along the top edge of the frame. The push pin 64 is effective to completely lift up at least the top edge of the frame off of the base 36. To complete removal of the frame, the vacuum tool 34 is applied to the frame with the vacuum energized and the frame is easily stripped off from the base 36 along the adhesive strip 20 along the bottom edge of the frame. The new or updated frame is then simply mounted on the base 36 in the same frame-receiving area from which the out-of-date frame was removed.

Figure 3:
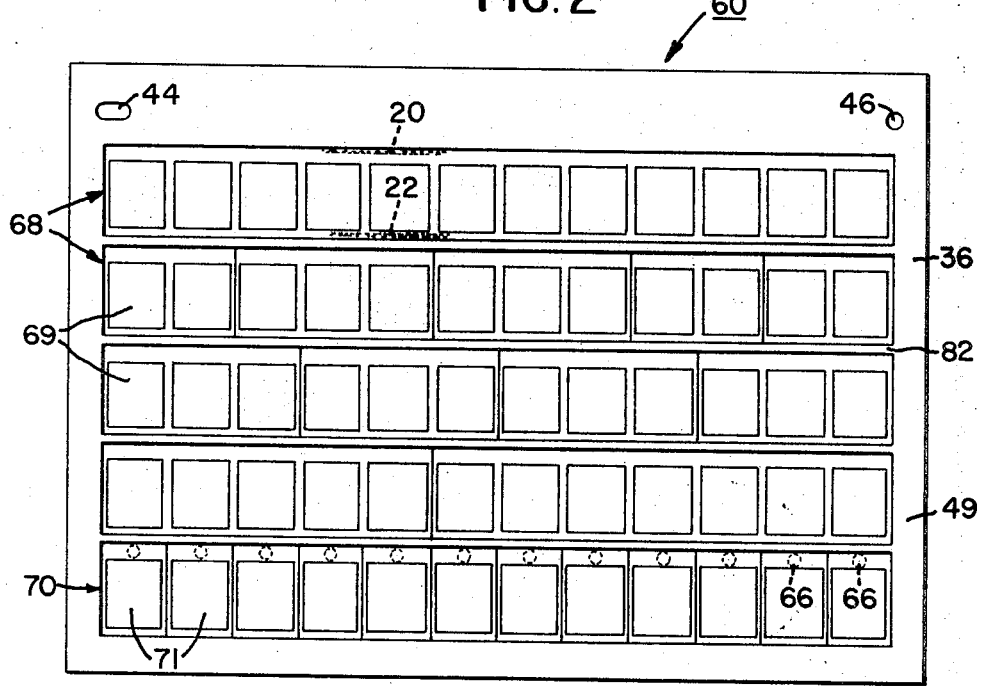
FIG. 3 is a plan view of a microfiche according to the present invention.

The microfiche 60 of the present invention will now be described with reference to FIGS. 3 and 4. The microfiche 60 comprises a carrier or base 36 and a plurality of parallel, equally spaced-apart, rows 68 of microfilm frames 69. The rows 68 may be formed of individual frames, filmstrips containing two or more frames, and combinations thereof.

The two, differently-shaped, spaced-apart registration openings 44 and 46 are positioned adjacent the top of the base; the opening 44 is elongated and the opening 46 is circular and about 0.125 inch in diameter. The rows 68 are spaced apart 0.050 inch. The height of each frame is about 0.629 inch, and the center-to-center spacing of frames in each row is about 0.446 inch. The base is about 4.134×5.856 inch. The cutter removes a slice about 0.030 inch in width from the filmstrip, to aid the operator in mounting the frames without any edge overlap.

The updatable frames 71 are all placed in a bottom row 70 and the base 36 is provided with a row of equally spaced-apart, in-line, clearance openings 66, one under each frame 71 in the bottom row 70. The openings 66 are located underneath the top adhesive strip 20 and are centrally positioned along the top edge of each frame 71.

Figure 4:
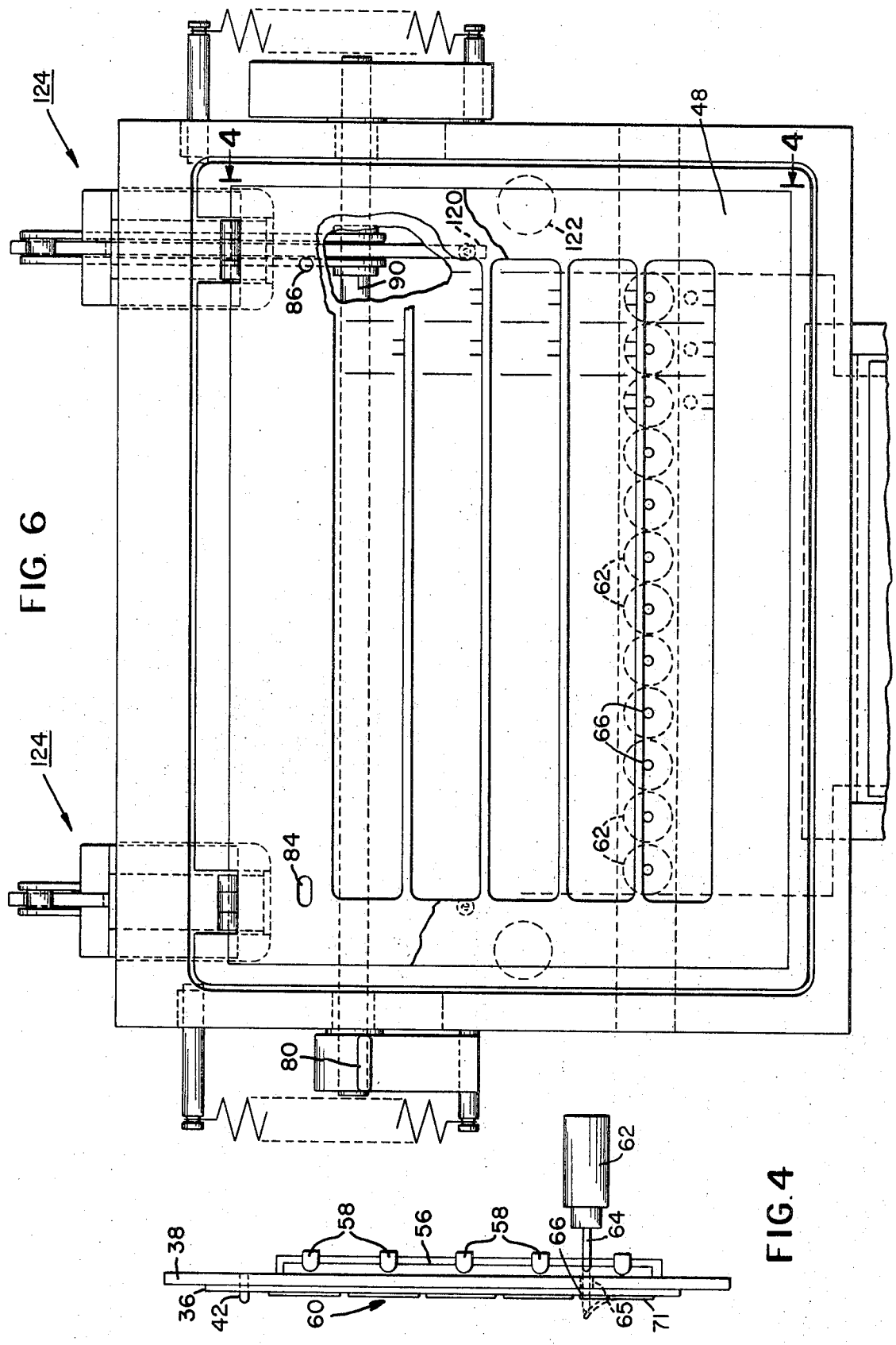
FIG. 4 is a cross-sectional view of the microfiche of FIG. 3, also showing the fiche deck, the L.E.D. grid, and a solenoid.

Referring now to FIG. 4, the clearance openings 66 in the fiche base 36 are each large enough to accommodate a solenoid push pin 64 of a solenoid 62 mounted beneath the fiche deck 38. The dotted lines in FIG. 4 show the position of a frame 71 and a push pin 64 after energization of a solenoid 62; the top edge of the frame 71 is pushed up off of the base 36. The frame 71 is then completely removed, preferably by use of the vacuum tool 34. The solenoid 62 is then deenergized, retracting the push pin 64, and the new updated frame can be mounted on the same area from which the frame 71 was removed.

FIG. 4 also shows an L.E.D. (light emitting diode) grid 56 mounted below the fiche deck 38 and containing a plurality of L.E.D.s 58 arranged in a rectilinear array with each L.E.D. 58 centrally positioned beneath a respective frame-receiving area of the base 36. The grid 56 is preferably a printed circuit board including the necessary wiring for individually energizing the L.E.D.s.

The margin grid 48 and its operation will now be described in more detail with reference to FIGS. 5–8. In operation, a lock lever 80 (see FIG. 1) on the cover 50 has an upper "release" position and a lower "lock" position. The lever 80 is pushed to its "release" position, the margin grid 48 is lifted up, a microfiche 60 is placed on the fiche deck 38 with the registration pins 40 and 42 extending through the two registration openings 44 and 46 in the base 36, the margin grid 48 is then moved back down on top of the microfiche 60 and the lever 80 is then moved to its "lock" position. When the margin grid 48 comes down on top of the microfiche 60, the ribs 52 of the margin grid 48 come down on top of the rows 68 of microfilm. When the lever 80 is pushed to its "lock" position, this causes the entire margin grid 48 to slide upwardly (as viewed in FIG. 1) across the microfiche 60 until the ribs 52 drop into spaces 82 between adjacent rows 68 of microfilm. The width of the ribs 52 is less than the width of the spaces 82.

Figure 5:
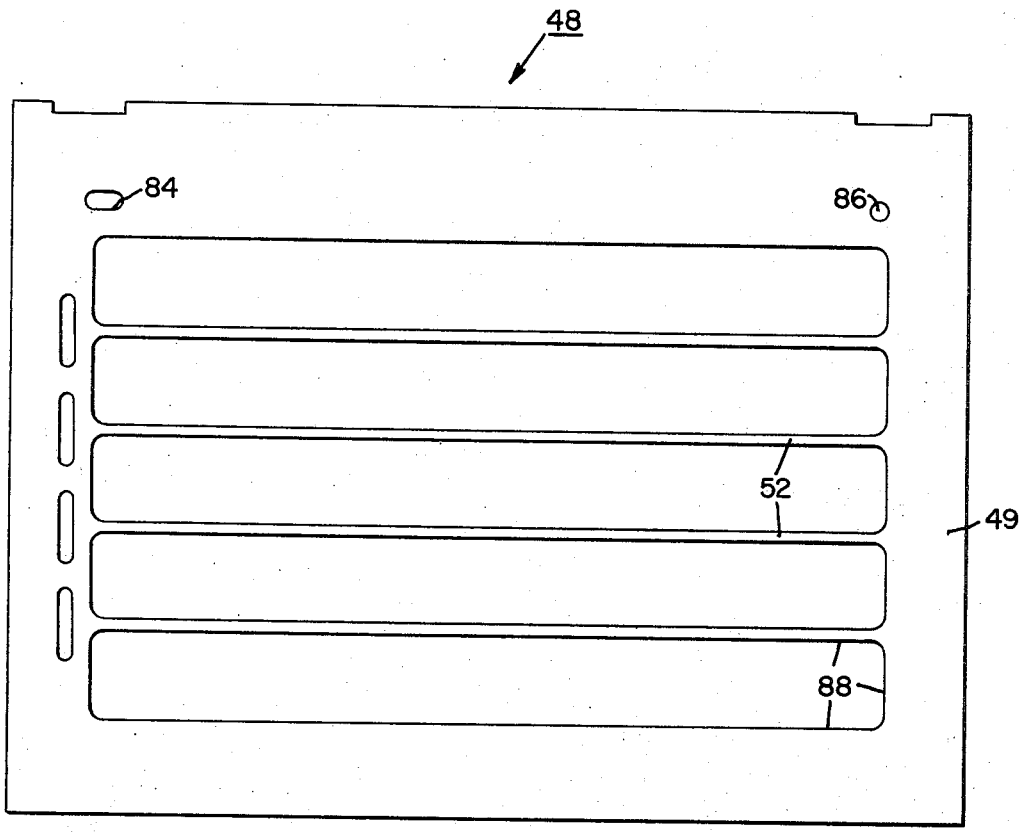
FIG. 5 is a plan view of the margin grid of the present invention.

FIG. 5 is a plan view of the margin grid 48 showing the ribs 52 with openings 88 therebetween, including a pair of openings 84 and 86 that provide clearance openings for the registration pins 40 and 42. The ribs 52 are preferably about 0.043 inch wide, and the openings 88 between the ribs are about 0.635 inch wide. The length of the openings 88 is about 5.547 inch. The ribs 52 are strengthened by applying a stretching force thereto along their longitudinal axis by applying a pulling force to the two short sides of the margin grid 48.

The mechanism (see FIGS. 6–8) for sliding the margin grid 48 up so that the ribs 52 drop into the spaces 82, includes the lever 80 pinned to an arcuately movable shaft 90, that is in turn connected to an arm 92. The arm 92 supports a roller 94 that is in engagement with a lever 96 pivoted at 98 and in abutting engagement with a pin 100. The pin 100 is slidably mounted in a movable plate 102 for movement to the left (as viewed in FIG. 8) against a compression spring 104. The pin 100 and the plate 102 are biased to the right (as viewed in FIG. 8) by the spring 104 and against a compression spring 106. The movable plate 102 is connected to the margin grid 48 at a pivot 108. The plate 102 slides to the left and right (as viewed in FIG. 8) with the margin grid 48. The plate 102 is slidably mounted in a stationary block 110 having a pair of stationary end plates 112 and 114 connected thereto against which one end of each of the springs 106 and 104, respectively, press.

Figure 7:
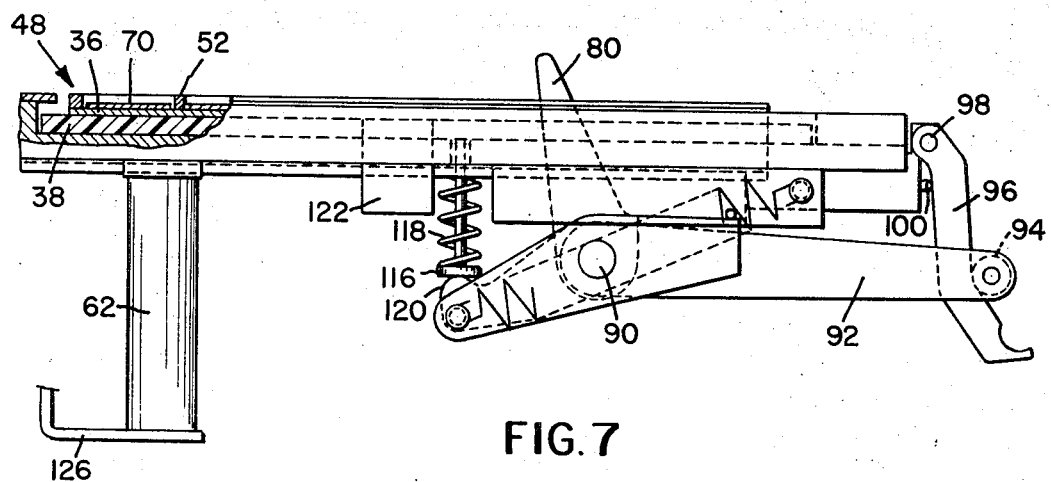
FIG. 7 is a side view of the apparatus OF FIG. 6.
Figure 8:
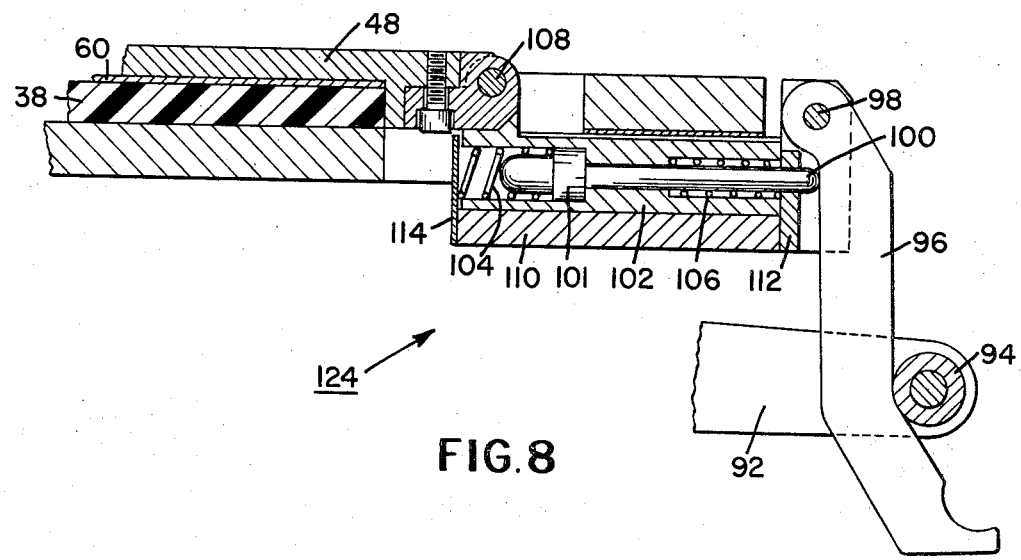
FIG. 8 is an enlarged view of a portion of the apparatus of FIG. 7.

Referring to FIG. 8, the parts are shown in the position occupied when the margin grid 48 is down and locked. To unlock and raise up the margin grid 48, the lock lever 80 (see FIG. 7) is pushed to the right (all references to directions are as viewed in FIG. 8); this rotates the arm 92 clockwise causing the lever 96 to also rotate clockwise and causes the pin 100 to move to the left against the force of the spring 104. When the pin 100 head 101 moves to the left, the spring 106 takes over and pushes the plate 102 and the margin grid 48 to the left. However, the margin grid 48 is lifted up off of the microfiche 60 before the margin grid 48 moves to the left, by means of a lifting plunger 116 (see FIG. 7) that is biased downwardly by a compression spring 118. A lifting arm 120 is pinned to the shaft 90 and rotates clockwise lifting the plunger 116 when the lever 80 is moved to its "release" position. When the margin grid 48 is down and locked, it is preferably held down by a magnet 122.

Thus, when the margin grid 48 is in its "up" position to receive a microfiche 60, the margin grid 48 is to the left as viewed in FIG. 8. After the margin grid 48 has been moved down on top of the microfiche, the lock lever 80 is moved to the left to the "lock" position, sliding the margin grid 48 to the right, about 0.010 inch, such that the ribs 52 fall into the spaces 82 between the rows 68 of microfilm on the microfiche 60. A slide assembly 124 as described above can be provided on each end of the shaft 90 as shown in FIG. 6.

Figure 9:
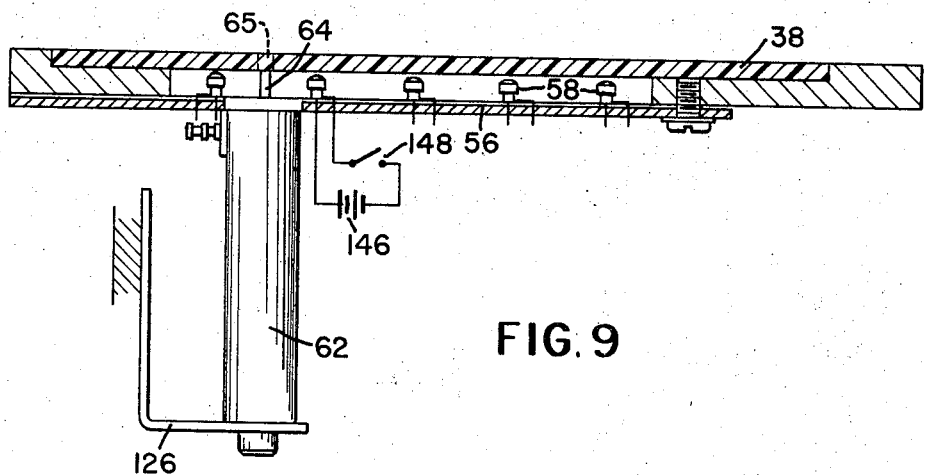
FIG. 9 is a partly cross-sectional side view of the fiche deck, L.E.D. grid, and solenoid apparatus of the present invention.

FIGS. 7 and 9 also show the location of the solenoids 62 with one each positioned below one each of the frame-receiving areas of a microfiche base 36 when positioned in registry on the fiche deck 38. The solenoids 62 are preferably located such that their push pins 64 are located underneath the top adhesive strip 20 on the bottom row 70 of filmstrip frames 71 on the microfiche 60.

FIG. 9 is another cross-sectional side view through the fiche deck 38 showing the solenoids 62, a solenoid support frame 126, and the L.E.D. grid 56 supporting the L.E.D.s 58 underneath the fiche deck 38. A power supply 146 is provided for energizing the L.E.D.s 58; a separate switch (for example, switch 148) is provided for separately energizing each of the L.E.D.s 58, whereby any one or more L.E.D.s 58 can be energized at the same time to show the operator where to place the next frame(s) to be mounted on the base 36 during converting, or what frame is to be updated during updating.

Figure 10:
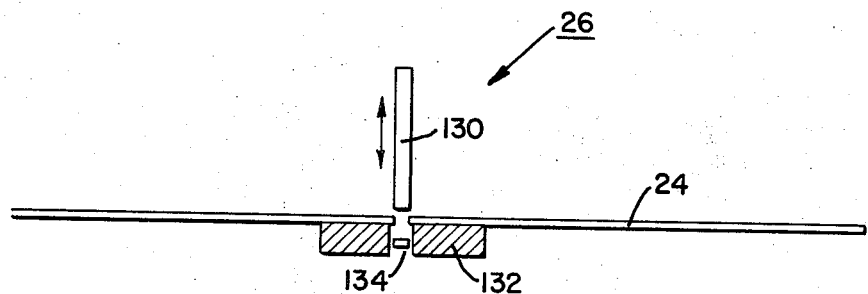
FIG. 10 is a partly cross-sectional side view of the cutting mechanism of the present invention.
Figure 11:
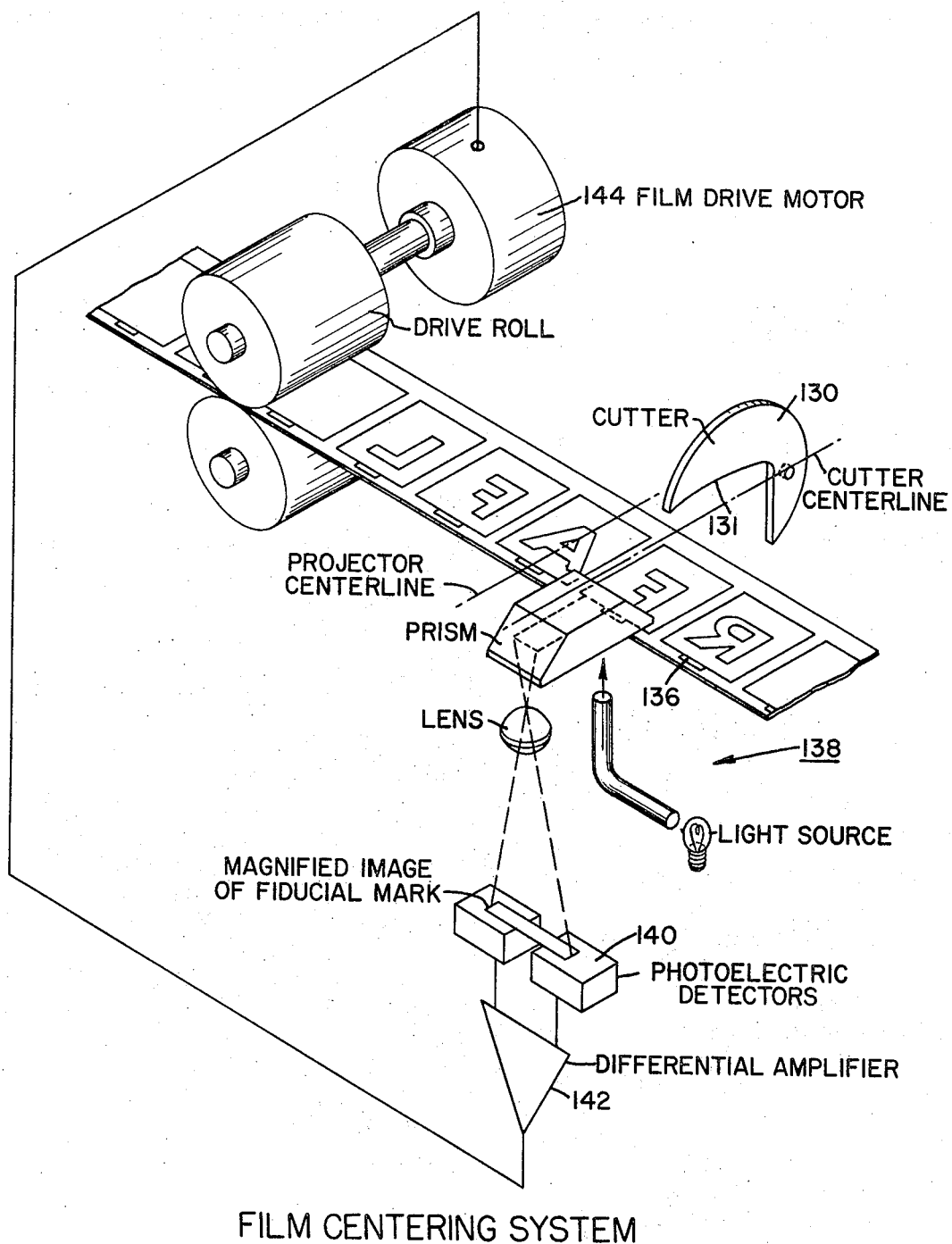
FIG. 11 is a partly diagrammatic, isometric view of the cutting and film centering system of the present invention.

FIGS. 10 and 11 show the cutter 26 of the present invention comprising a blade 130, preferably having a concave cutting edge 131, cooperating with a cutting die 132 for cutting out a slice 134 from the filmstrip 24. The slice 134 is preferably about 0.030 inch wide. By having the frame (or the end frames of a filmstrip) narrower than the frame-receiving area, the operator can quickly and easily mount the frame (or filmstrip) without having the ends overlap the adjacent frames. The blade 130 is preferably actuated by a motor and crank arm (not shown) as will be understood by one skilled in the art, and such energizing means forms no part of the present invention; the invention in the cutter 26 being in cutting out the slice 134 in a microfiche mounting process. Other types of cutters can be employed, if desired.

FIG. 11 also shows the use of a fiducial mark 136 and an optical system 138 to impinge it on a pair of photoelectric detectors 140. The signals from the photoelectric detectors 140 is fed to a differential amplifier 142 and then to a film drive motor 144, for use in properly centering the next filmstrip frame to be cut.

The present invention is not limited to the specifics of the preferred embodiments described above, as will clearly be understood by one skilled in the art. For example, it is not necessary that the microfiche format be that of 5 rows of 12 frames each. Other mounting systems can be used in place of the pair of adhesive strips 20 and 22. A single solenoid can be used with a guide bar for moving it (or the ejecting pin) to the desired frame, in place of a separate solenoid and ejector pin for each updatable frame. The updatable frames need not be placed in only the bottom row, they can be placed in any row and can take up more than one row, if desired. Other frame lighting or indicating means can be used in place of the L.E.D. grid with a separate L.E.D. for each frame. For example, instead of the fiche deck 38 being transparent with lights located underneath it, the fiche deck can be opaque with the lights incorporated in its surface. Different types of cutters can be used in place of the motor actuated cutter 26, however, it is preferred that whatever cutter is used does cut out a slice from the filmstrip. The margin grid 48 can be slid into position manually, if desired, and in fact can be made to come down directly into place, without sliding. The registration openings 44 and 46 are positioned on the base 36 in such a way, and are shaped and sized in such a way, that the base 36 can not be mounted on the fiche deck 38 and on the registration pins 40 and 42 in any other orientation than the correct orientation. The openings 44 and 46 are thus "different," (as defined for use in the present specification) either by shape, size, or orientation on the base, to provide only a single correct orientation. Thus, they may be the same shape and size but at different positions on the base, or they may be of the same shape and position but of different size, or they may be of different shape but of the same size and position, or they may be different in more than one way.

The converter/updater 10 of the present invention can be computer-directed or can be operated manually, with the operator following instructions for each tape, for example, telling her what lights to turn on and how many frames should be cut off of the filmstrip. When computer-directed, information is fed into a computer when the original material is being microfilmed. This information is then fed out of the computer into the converter/updater 10 in synchronism with the particular supply reel 12 and the particular next frame(s) on the reel to be cut and mounted. The converter/updater 10 can then automatically feed out the right number of frames, cut them off, and light up the right L.E.D.s, to tell the operator where to mount the frames and when she is through with a particular microfiche.

The invention has been described in detail with particular reference to the preferred embodiments thereof, but it will be understood that variations and modifications can be effected within the spirit and scope of the invention as described hereinabove and as defined in the appended claims.

We claim:

1. A method for making microfiche of the type including a transparent base and a plurality of parallel rows of microfilm frames mounted on the base, said frames including "permanent" frames that will never be updated, and "updatable" frames that may be updated, said method comprising:
   a. pre-cutting from any adjacent frame, each updatable frame to be monted, said pre-cutting being prior to mounting;
   b. mounting said pre-cut frames on said base in pre-determined frame-receiving areas; and
   c. mounting all permanent frames, as film strips of one or more frames, in any frame-receiving area on the base except in said predetermined areas.

2. The method according to claim 1 wherein said updatable frame mounting step comprises mounting all of said updatable frames in a single row on said base.

3. The method according to claim 1 including updating said microfiche by individually removing an updatable frame from said base and replacing said removed frame with an updated frame by mounting the updated frame in the same frame-receiving area from which said removed frame was removed.

4. The method according to claim 3 including mounting said microfiche on a fiche deck having a separate light source underneath each frame-receiving area on said base, and energizing the light under an updatable frame to be removed to indicate to an operator what frame is to be removed.

5. The method according to claim 3 including providing said base with a plurality of push pin clearance openings located only in said updatable frame-receiving areas.

6. The method according to claim 5 including mounting said frames on said base by a pair of adhesive strips, one along each of a top and a bottom edge of said frame outside of the image area of said frame, and wherein said removing step comprises lifting up one edge of said frame over one of said strips, by pushing said edge up off of said base from underneath.

7. The method according to claim 6 wherein said pushing step includes positioning a solenoid having a solenoid push pin beneath said base with said pin in register with one of said clearance openings, and energizing said solenoid.

8. The method according to claim 7 wherein said updatable row is the bottom row on said base.

9. The method according to claim 8 wherein said removing step comprises completely removing a frame to be deleted that has been partially removed by said pushing step, by engaging said frame with the vacuum foot of a vacuum tool and peeling it off of said base.

10. The method according to claim 9 including mounting said microfiche on a fiche deck having a separate light source underneath each frame-receiving area on said base, and energizing the light under an updatable frame to be removed to indicate to an operator what frame is to be removed.

11. The method according to claim 7 including positioning a solenoid and its push pin underneath each of said updatable frame-receiving areas with each of said push pins underneath one of said adhesive strips.

12. A method for making microfiche of the type including a transparent base and a plurality of parallel rows of microfilm frames mounted on the base, comprising:
   a. mounting said base in a predetermined orientation on a fiche deck having a light source corresponding to each frame-receiving area of said base;
   b. cutting off, from a microfilm roll, a number of frames;
   c. energizing a number of said light sources corresponding in number to the number of said cut-off frames; and
   d. mounting said cut-off frame(s) on said base on the frame-receiving areas of said base under which a light source has been energized.

13. The method according to claim 12 including the step of cutting out a slice from each frame that is cut to aid in mounting said frame on said base.

14. The method according to claim 13 including manually manipulating said cut frames with a vacuum tool.

* * * * *